(12) United States Patent
Ito

(10) Patent No.: US 11,500,251 B2
(45) Date of Patent: Nov. 15, 2022

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Higashihiroshima (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/350,762

(22) Filed: Jun. 17, 2021

(65) Prior Publication Data

US 2021/0397052 A1 Dec. 23, 2021

(30) Foreign Application Priority Data

Jun. 17, 2020 (JP) .............................. JP2020-104722

(51) Int. Cl.
*G02F 1/1343* (2006.01)
*G02F 1/1362* (2006.01)

(52) U.S. Cl.
CPC .... *G02F 1/134354* (2021.01); *G02F 1/13439* (2013.01); *G02F 1/134318* (2021.01); *G02F 1/136286* (2013.01)

(58) Field of Classification Search
None
See application file for complete search history.

(56) References Cited

U.S. PATENT DOCUMENTS

| | | | |
|---|---|---|---|
| 2012/0249897 A1* | 10/2012 | Ito | G02F 1/136227 349/5 |
| 2016/0299341 A1* | 10/2016 | Yoshida | G02F 1/134309 |
| 2019/0121209 A1 | 4/2019 | Izawa et al. | |
| 2019/0196281 A1* | 6/2019 | Oikawa | H01L 27/124 |

FOREIGN PATENT DOCUMENTS

| | | |
|---|---|---|
| JP | 2007-324534 A | 12/2007 |
| JP | 2019-78825 A | 5/2019 |

\* cited by examiner

*Primary Examiner* — Richard H Kim
(74) *Attorney, Agent, or Firm* — Oliff PLC

(57) ABSTRACT

An electro-optical device. The electro-optical device includes an pixel electrode that applies the electric field to the electro-optical layer, a transistor that includes a semiconductor layer including a drain region, a capacitance element that includes a first capacitance electrode and a second capacitance electrode, an electrode contact coupled to the pixel electrode, and a drain relay electrode electrically coupled to the drain region. The pixel electrode contact is coupled to the second capacitance electrode and the drain relay electrode.

8 Claims, 7 Drawing Sheets

ELECTRO-OPTICAL DEVICE AND ELECTRONIC APPARATUS

The present application is based on and claims priority from JP Application Serial Number 2020-104722, filed Jun. 17, 2020, the disclosure of which is hereby incorporated by reference herein in its entirety.

BACKGROUND

1. Technical Field

The present disclosure relates to an electro-optical device and an electronic apparatus.

2. Related Art

For example, an electro-optical device capable of changing optical characteristics for each pixel is used in an electronic apparatus, such as a projector.

An electro-optical device described in JP-A-2019-78825 includes a first substrate, a second substrate, and a liquid crystal layer disposed between the two substrates. The first substrate includes a transistor including a drain, a relay electrode, a capacitor, and a pixel electrode. The transistor, a drain relay electrode, the capacitor, and the pixel electrode are arranged so as to become closer to the liquid crystal layer in this order.

The drain relay electrode is electrically coupled to a drain region of the transistor. The capacitor includes a capacitance electrode coupled to the drain relay electrode via a contact hole. The pixel electrode is coupled to the capacitance electrode via another contact hole. Thus, the pixel electrode is electrically coupled to the drain relay electrode.

In the manufacture of the first substrate described in JP-A-2019-78825, the capacitance electrode and the pixel electrode are coupled after coupling the drain relay electrode and the capacitance electrode. Therefore, the two contact holes are required for the electrical coupling between the drain relay electrode and the pixel electrode. When the drain relay electrode and the pixel electrode are electrically coupled using the plurality of contact holes, this requires a significantly large amount of time and effort in the manufacturing process. Further, when a plurality of contact hole contacts are necessary, there is a risk of restrictions to a layout of the contacts and wiring. As a result, it is difficult to reduce the size of the electro-optical device while suppressing a reduction in an opening ratio.

SUMMARY

An electro-optical device according to an aspect of the present disclosure is an electro-optical device including an electro-optical layer, optical characteristics of the electro-optical layer changing in accordance with an electric field. The electro-optical device includes an pixel electrode configured to apply the electric field to the electro-optical layer, a transistor including a semiconductor layer including a drain region, a capacitance element including a first capacitance electrode and a second capacitance electrode, an electrode contact coupled to the pixel electrode, and a drain relay electrode electrically coupled to the drain region. The pixel electrode contact is coupled to the second capacitance electrode and the drain relay electrode.

An electronic apparatus according to an aspect of the present disclosure includes the electro-optical device according to the above-described aspect, and a control unit configured to control operations of the electro-optical device.

DESCRIPTION OF EXEMPLARY EMBODIMENTS

Figure 1:
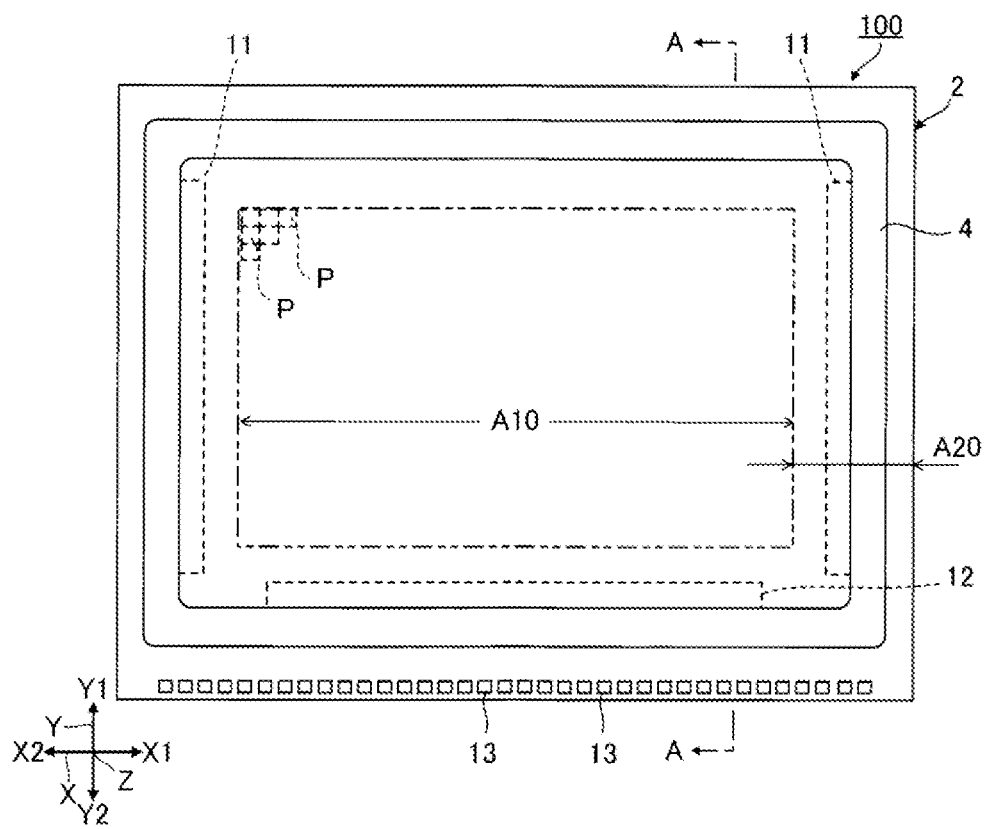
FIG. 1 is a plan view of an electro-optical device according to a first embodiment.

Preferred embodiments of the present disclosure will be described below with reference to the accompanying drawings. Note that, in the drawings, dimensions and scales of each section are different from actual dimensions and scales as appropriate, and some sections are schematically illustrated for ease of understanding. Further, the scope of the present disclosure is not limited to these embodiments unless otherwise stated to limit the present disclosure in the following descriptions.

1. Electro-Optical Device

1A. First Embodiment

1Aa. Basic Configuration

Figure 2:
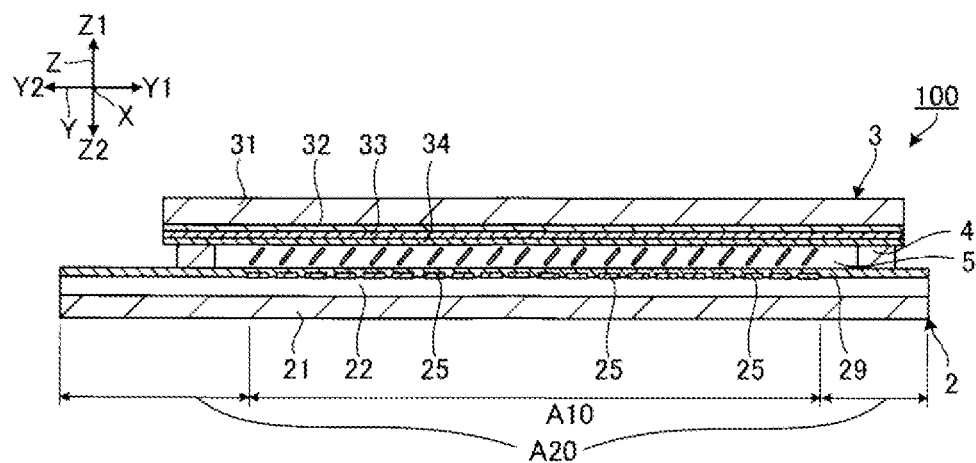
FIG. 2 is a cross-sectional view along a line A-A of the electro-optical device illustrated in FIG. 1.

FIG. 1 is a plan view of an electro-optical device 100 according to a first embodiment. FIG. 2 is a cross-sectional view along a line A-A of the electro-optical device 100 illustrated in FIG. 1. Note that in FIG. 1, illustration of a counter substrate 3 is omitted. Further, for convenience of explanation, hereinafter, the description will be made as appropriate using an X-axis, a Y-axis, and a Z-axis, which are orthogonal to each other. Further, one direction along the X-axis is designated as an X1 direction, and the direction opposite the X1 direction is designated as an X2 direction. Similarly, one direction along the Y-axis is designated as a Y1 direction, and the direction opposite the Y1 direction is designated as a Y2 direction. One direction along the Z-axis is designated as a Z1 direction, and the direction opposite the Z1 direction is designated as a Z2 direction. Further, hereinafter, viewing in the Z1 direction or the Z2 direction is referred to as "plan view", and a view from a direction perpendicular to a cross section including the Z-axis is referred to as a "cross-sectional view".

The electro-optical device 100 illustrated in FIG. 1 and FIG. 2 is an active matrix drive transmission type liquid crystal device. As illustrated in FIG. 2, the electro-optical device 100 includes a transmissive element substrate 2, the transmissive counter substrate 3, a frame-shaped sealing member 4, and a liquid crystal layer 5. Note that "transmissive" refers to transmittance with respect to visible light, and means that a transmittance of visible light is preferably equal to or greater than 50%. Further, the element substrate 2, the liquid crystal layer 5, and the counter substrate 3 are arranged in this order in the Z1 direction. The counter substrate 3 is disposed with respect to the element substrate 2 with the liquid crystal layer 5 interposed therebetween. Note that the shape of the electro-optical device 100 illustrated in FIG. 1 in plan view is rectangular, but may be circular, for example.

As illustrated in FIG. 2, the element substrate 2 is a substrate including a plurality of thin film transistors (TFTs) to be described below. The element substrate 2 includes a first substrate 21, a stack body 22, a plurality of pixel electrodes 25, and a first oriented film 29. The first substrate 21, the stack body 22, the plurality of pixel electrodes 25, and the first oriented film 29 are arranged in this order in the Z1 direction. Further, although not illustrated, the element substrate 2 includes a plurality of dummy pixel electrodes that surround the plurality of pixel electrodes 25 in plan view.

The first substrate 21 is a transmissive plate having insulating properties. The first substrate 21 includes, for example, a glass substrate or a quartz substrate. The TFTs described below are disposed in the stack body 22. Note that the stack body 22 will be described later. Further, each of the pixel electrodes 25 is transmissive. Each of the pixel electrodes 25 includes a transparent conductive material, such as indium tin oxide (ITO), indium zinc oxide (IZO), or fluorine-doped tin oxide (FTO), or the like. The pixel electrode 25 is an example of an "electrode." The pixel electrode 25 applies an electric field to the liquid crystal layer 5. The thickness direction of the pixel electrode 25 is aligned with the Z1 direction or the Z2 direction. The first oriented film 29 is transmissive and has insulating properties. The oriented film 29 orients liquid crystal molecules of the liquid crystal layer 5. Examples of the material of the first oriented film 29 include silicon oxide or polyimide, for example.

The counter substrate 3 is a substrate disposed facing the element substrate 2. Note that the counter substrate 3 includes a second substrate 31, an insulating film 32, a common electrode 33, and an oriented film 34. The second substrate 31, the insulating film 32, the common electrode 33, and the oriented film 34 are arranged in the Z2 direction in this order. Further, although not illustrated, the counter substrate 3 includes a partition that has light shielding properties and surrounds the plurality of pixel electrodes 25 in plan view. "Light shielding properties" refers to a light shielding performance with respect to visible light, and preferably means that a transmittance of visible light is less than 50%, and more preferably, is less than 10%.

The second substrate 31 is a transmissive plate having insulating properties. The second substrate 31 includes, for example, a glass substrate or a quartz substrate. The insulating film 32 is transmissive and has insulating properties. The material of the insulating film 32 is an inorganic material such as silicon oxide or the like. The common electrode 33 is a counter electrode disposed with respect to the plurality of pixel electrodes 25 with the liquid crystal layer 5 interposed therebetween. The common electrode 33 includes a transparent conductive material such as ITO, IZO, FTO, or the like. The common electrode 33 applies an electric field to the liquid crystal layer 5. The second oriented film 34 is transmissive and has insulating properties. The second oriented film 34 orients the liquid crystal molecules of the liquid crystal layer 5. Examples of the material of the second oriented film 34 include silicon oxide or polyimide, for example.

The sealing member 4 is disposed between the element substrate 2 and the counter substrate 3. The sealing member 4 is formed using an adhesive or the like containing various types of curable resin, such as epoxy resin, for example. The sealing member 4 may include a gap material formed from an inorganic material, such as glass. The sealing member 4 is affixed to each of the element substrate 2 and the counter substrate 3.

The liquid crystal layer 5 is disposed in a region surrounded by the element substrate 2, the counter substrate 3, and the sealing member 4. The liquid crystal layer 5 is disposed between the plurality of pixel electrodes 25 and the common electrode 33. The liquid crystal layer 5 is an electro-optical layer whose optical characteristics change in accordance with an electric field. The liquid crystal layer 5 contains the liquid crystal molecules having positive or negative dielectric anisotropy. The orientation of the liquid crystal molecules changes in accordance with a voltage applied to the liquid crystal layer 5. The liquid crystal layer 5 modulates light in accordance with the applied voltage, and can thus perform gradation display.

As illustrated in FIG. 1, a plurality of scanning line drive circuits 11, a data line drive circuit 12, and a plurality of external terminals 13 are disposed on the element substrate 2. Although not illustrated, some of the plurality of external terminals 13 are coupled to wiring drawn from the scanning line drive circuits 11 or the data line drive circuit 12. Further, the plurality of external terminals 13 include terminals to which a common potential is applied. These terminals are electrically coupled to the common electrode 33 of the counter substrate 3 via wiring and a conductive material (not illustrated).

The electro-optical device 100 includes a display region A10 that displays an image, and a peripheral region A20 positioned outside the display region A10 in plan view. The display region A10 includes a plurality of pixels P arrayed in a matrix pattern. The plurality of pixel electrodes 25 are disposed in a one-to-one correspondence with respect to the plurality of pixels P. The common electrode 33 described above is provided in common to the plurality of pixels P. Further, the peripheral region A20 surrounds the display region A10 in plan view. The scanning line drive circuits 11, the data line drive circuit 12, and the like are disposed in the peripheral region A20.

In the embodiment, the electro-optical device 100 is the transmissive type device. Thus, for example, the image is displayed as a result of light incident on the counter substrate 3 being modulated while being emitted from the element substrate 2. Further, for example, the image may be displayed as a result of light incident on the element substrate 2 being modulated while being emitted from the counter substrate 3. Further, the electro-optical device 100 may also be a reflective type device. In this case, for example, the common electrode 33 is transmissive and the pixel electrodes 25 are reflective. In the case of the reflective type device, the image is displayed as a result of the light incident on the counter substrate 3 being reflected by the pixel electrodes 25 and being modulated while being once again emitted from the counter substrate 3.

Further, the electro-optical device 100 is applied to a display device that performs color display, such as a personal computer and a smartphone to be described below. When applied to the display device, a color filter is used as appropriate for the electro-optical device 100. Further, the electro-optical device 100 is applied to a projection-type projector to be described below, for example. In this case, the electro-optical device 100 functions as a light valve. Note that, in this case, the color filter is omitted from the electro-optical device 100.

1Ab. Electrical Configuration of Element Substrate 2

Figure 3:
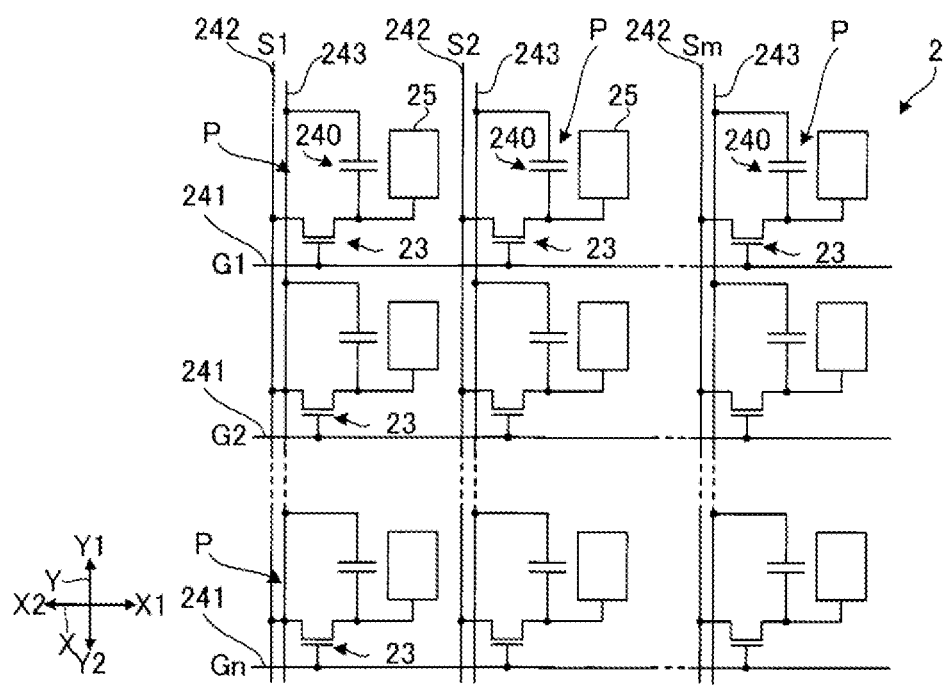
FIG. 3 is an equivalent circuit diagram illustrating an electrical configuration of an element substrate illustrated in FIG. 1.

FIG. 3 is an equivalent circuit diagram illustrating an electrical configuration of the element substrate 2. The first substrate 21 of the element substrate 2 is provided with a plurality of transistors 23, n scanning lines 241, m data lines 242, and n constant potential lines 243 illustrated in FIG. 3. Note that n and m are integers of 2 or greater, respectively. The transistors 23 are disposed corresponding to each of intersections between the n scanning lines 241 and the m data lines 242. Each of the transistors 23 is a TFT that functions as a switching element, for example. Each of the transistors 23 includes a gate, a source, and a drain.

Each of the n scanning lines 241 extends in the X1 direction, and the n scanning lines 241 are arranged at equal intervals in the Y1 direction. Each of the n scanning lines 241 is electrically coupled to the gate of the corresponding transistor 23, of the plurality of transistors 23. The n scanning lines 261 are electrically coupled to the scanning line drive circuits 11 illustrated in FIG. 1. Scanning signals G1, G2, □, Gn are line-sequentially supplied from the scanning line drive circuits 11 to the first to n-th scanning lines 241.

Each of the m data lines 242 illustrated in FIG. 3 extends in the Y1 direction, and the m data lines 242 are arranged at equal intervals in the X1 direction. Each of the m data lines 242 is electrically coupled to the source of the corresponding transistor 23, of the plurality of transistors 23. The m data lines 242 are electrically coupled to the data line drive circuit 12 illustrated in FIG. 1. Image signals S1, S2, □, Sm are line-sequentially supplied from the data line drive circuit 12 to the first to m-th data lines 242.

The n scanning lines 241 and the m data lines 242 are electrically insulated from each other, and are formed in a lattice-like pattern in plan view. A region surrounded by two of the adjacent scanning lines 241 and two of the adjacent data lines 242 corresponds to the pixel P. Each of the pixel electrodes 25 is electrically coupled to the drain of the corresponding transistor 23.

Each of the n constant potential lines 243 extends in the Y1 direction, and the n constant potential lines 243 are arranged at equal intervals in the X1 direction. Further, the n constant potential lines 243 are electrically insulated with respect to the m data lines 242 and the n scanning lines 241, and are disposed so as to be separated from the m data lines 242 and the n scanning lines 241. A fixed potential such as a ground potential is applied to each of the constant potential lines 243. Each of the n constant potential lines 243 is a capacitance line electrically coupled to the corresponding capacitance element 240. Each of the capacitance elements 240 is a storage capacitor for holding the potential of the pixel electrode 25. Note that the plurality of capacitance elements 240 are electrically coupled to the plurality of pixel electrodes 25 in a one-to-one correspondence. The plurality of capacitance elements 240 are electrically coupled to the drains of the plurality of transistors 23 in a one-to-one correspondence.

The scanning signals G1, G2, □, Gn become sequentially active and, when the n scanning lines 241 are sequentially selected, the transistor 23 coupled to the selected scanning line 241 is turned to an on state. Then, the image signals S1, S2, □, Sm having magnitudes commensurate with the gradation to be displayed are transmitted, via the m data lines 242, to the pixel P corresponding to the selected scanning line 241, and are then applied to the pixel electrode 25. In this way, the voltage commensurate with the gradation to be displayed is applied to a liquid crystal capacitor formed between the pixel electrodes 25 and the common electrode 33 illustrated in FIG. 2, and the orientation of the liquid crystal molecules changes in accordance with the applied voltage. Further, the applied voltage is held by the storage capacitor 240. The light is modulated by these changes in the orientation of the liquid crystal molecules, and the gradation display becomes possible.

1Ac. Configuration of Stack Body 22 of Element Substrate 2

Figure 4:
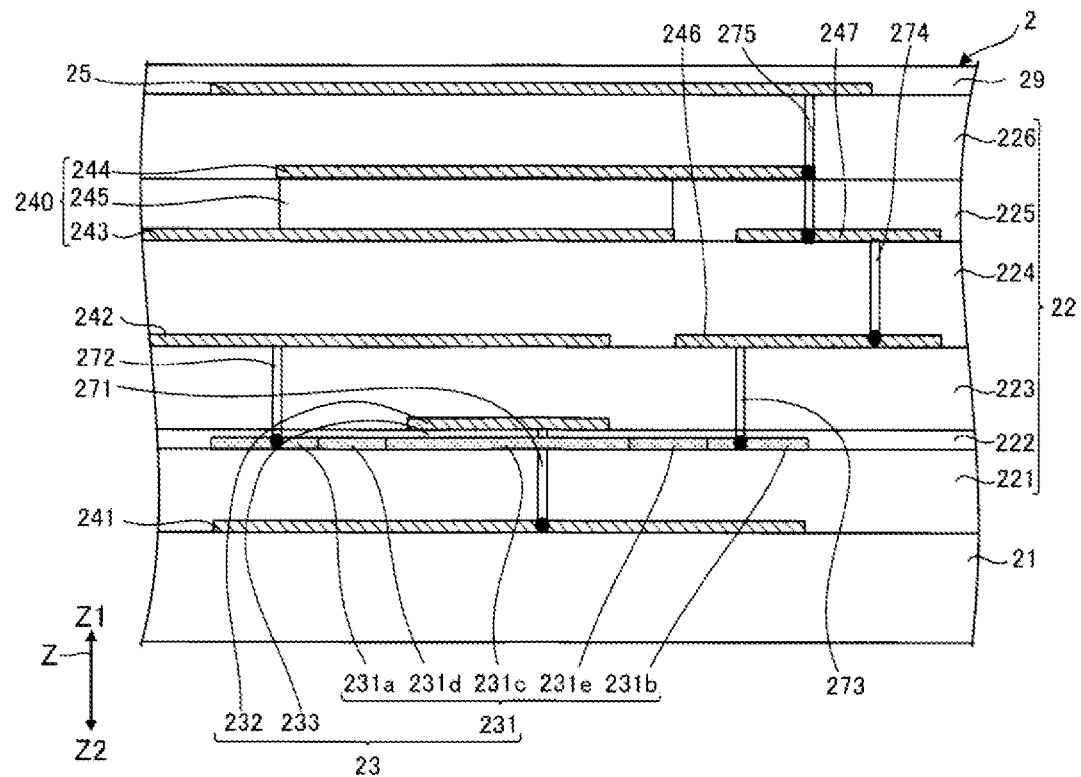
FIG. 4 is a diagram schematically illustrating a portion of the element substrate illustrated in FIG. 1.

FIG. 4 is a diagram schematically illustrating a portion of the element substrate 2 illustrated in FIG. 2. The stack body 22 illustrated in FIG. 4 is transmissive and has insulating properties. The stack body 22 includes a plurality of insulating layers 221, 222, 223, 224, 225, and 226. The insulating layers 221, 222, 223, 224, 225, and 226 are layered in this order from the first substrate 21 toward the plurality of pixel electrodes 25. The material of each of the layers of the stack body 22 is, for example, an inorganic material such as silicon oxynitride, silicon nitride, and the like.

The plurality of transistors 23, wiring, and the like are disposed between the layers of the stack body 22. FIG. 4 illustrates the wiring and the like relating to one of the pixels P. Specifically, the scanning line 241, the transistor 23, the data line 242, the capacitance element 240, a first relay electrode 246, a second relay electrode 247, a first conduction portion 271, a second conduction portion 272, a third conduction portion 273, a fourth conduction portion 274, and an electrode contact 275 are disposed in the stack body 22. The capacitance element 240 includes the constant potential line 243, a second capacitance electrode 244, and a dielectric layer 245. The second relay electrode 247 is an example of a "drain relay electrode".

The transistor 23, the capacitance element 240, the first relay electrode 246, the second relay electrode 247, the first conduction portion 271, the second conduction portion 272, the third conduction portion 273, the fourth conduction portion 274, and the electrode contact 275 are disposed for each of the pixels P. Note that, although not illustrated in plan view, the plurality of transistors 23, the wiring, and the like are lattice-shaped, and are disposed between the plurality of pixel electrodes 25 in plan view. In FIG. 4, the arrangement of the transistors 23 and the wiring in an X-Y plane is schematically illustrated.

As illustrated in FIG. 4, the scanning line 241 is disposed between the first substrate 21 and the insulating layer 221. The transistor 23 is disposed on the insulating layer 221. The transistor 23 includes a semiconductor layer 231 having a lightly doped drain (LDD) structure, a gate electrode 232, and a gate insulating film 233.

The semiconductor layer 231 is disposed on the insulating layer 221. The semiconductor layer 231 includes a source region 231$a$, a drain region 231$b$, a channel region 231$c$, a first LDD region 231$d$, and a second LDD region 231$e$. The channel region 231$c$ is positioned between the source region 231*a* and the drain region 231*b*. The first LDD region 231*d* is positioned between the channel region 231*c* and the source region 231*a*. The second LDD region 231*e* is positioned between the channel region 231*c* and the drain region 231*b*. The semiconductor layer 231 is formed, for example, by forming a film of polysilicon, and the regions excluding the channel region 231*c* are doped with impurities that enhance conductivity. An impurity concentration in the first LDD region 231*d* and the second LDD region 231*e* is lower than an impurity concentration in the source region 231*a* and the drain region 231*b*. Note that at least one of the first LDD region 231*d* and the second LDD region 231*e*, and in particular, the first LDD region 231*d* may be omitted.

The gate electrode 232 is disposed between the insulating layer 222 and the insulating layer 223. Although not illustrated in plan view, the gate electrode 232 overlaps with the channel region 231*c* of the semiconductor layer 231 in plan view. The gate electrode 232 is formed, for example, by doping polysilicon with impurities that enhance the conductivity of the polysilicon. Note that the gate electrode 232 may be formed using a material that has conductivity, such as a metal, a metal silicide, and a metal compound. Further, the gate insulating film 233 is interposed between the gate electrode 232 and the channel region 231*c*. The gate insulating film 233 is formed of silicon oxide formed by thermal oxidation or CVD (chemical vapor deposition), for example.

The data line 242 and the first relay electrode 246 are disposed between the insulating layer 223 and the insulating layer 224. In the embodiment, in a cross-sectional view, the transistor 23 is disposed between the data line 242 and the above-described scanning line 241. With such an arrangement, the scanning line 241 and the data line 242 can function as a light shielding film. Thus, the incidence of light on the transistor 23 can be suppressed.

The constant potential line 243 and the second relay electrode 247 are disposed on the insulating layer 224. A portion of the constant potential line 243 is also one of a pair of capacitance electrodes included in the capacitance element 240. In other words, the capacitance element 240 includes a first capacitance electrode configured by the portion of the constant potential line 243, and the second capacitance electrode 244. A fixed potential is applied to the first capacitance electrode. Further, the dielectric layer 245 is disposed between the constant potential line 243 and the second capacitance electrode 244. Further, the second capacitance electrode 244 is disposed between the insulating layer 225 and the insulating layer 226.

The pixel electrode 25 is disposed on the insulating layer 226. Note that a layer containing glass, such as borosilicate glass (BSG), may be disposed between the insulating layer 226 and the pixel electrodes 25.

Respective materials of the above-described scanning line 241, data line 242, first relay electrode 246, second relay electrode 247, constant potential line 243, and second capacitance electrode 244 include metals such as tungsten (W), titanium (Ti), chromium (Cr), iron (Fe), and aluminum (Al), or metal materials such as metal nitrides, metal silicides, and the like. Specifically, for example, various types of the wiring include an aluminum film and a titanium nitride film. By including the aluminum film, resistance can be reduced compared to a case where the wiring is formed by only the titanium nitride film.

Each of the first conduction portion 271, the second conduction portion 272, the third conduction portion 273, the fourth conduction portion 274, and the electrode contact 275 illustrated in FIG. 4 is a conductive penetration electrode. Each of these is, for example, a columnar plug.

The first conduction portion 271 couples the gate electrode 232 and the data line 242. The first conduction portion 271 penetrates the insulating layer 221. Note that the gate electrode 232 and the first conduction portion 271 are formed separately and coupled, but may be formed integrally. Further, the second conduction portion 272 couples the source region 231*a* of the semiconductor layer 231 and the data line 242. The second conduction portion 272 penetrates the insulating layer 222 and the insulating layer 223. Note that the data line 242 and the second conduction portion 272 are formed separately and coupled, but may be formed integrally.

The third conduction portion 273 couples the drain region 231*b* of the semiconductor layer 231 and the first relay electrode 246. The third conduction portion 273 penetrates the insulating layer 222 and the insulating layer 223. Note that the first relay electrode 246 and the third conduction portion 273 are formed separately and coupled, but may be formed integrally. Further, the fourth conduction portion 274 couples the first relay electrode 246 and the second relay electrode 247. The fourth conduction portion 274 penetrates the insulating layer 224. Note that the second relay electrode 247 and the fourth conduction portion 274 are formed separately and coupled, but may be formed integrally.

The electrode contact 275 couples the second relay electrode 247, the second capacitance electrode 244, and the pixel electrode 25 to each other. Thus, each of the second relay electrode 247, the second capacitance electrode 244, and the pixel electrode 25 is electrically coupled to the drain region 231*b* of the semiconductor layer 231.

Examples of the materials of the above-described first conduction portion 271, second conduction portion 272, third conduction portion 273, fourth conduction portion 274, and electrode contact 275 include metals such as tungsten, cobalt (Co), copper (Cu), and the like, and metal materials such as metal nitrides, metal silicides, and the like.

Figure 5:
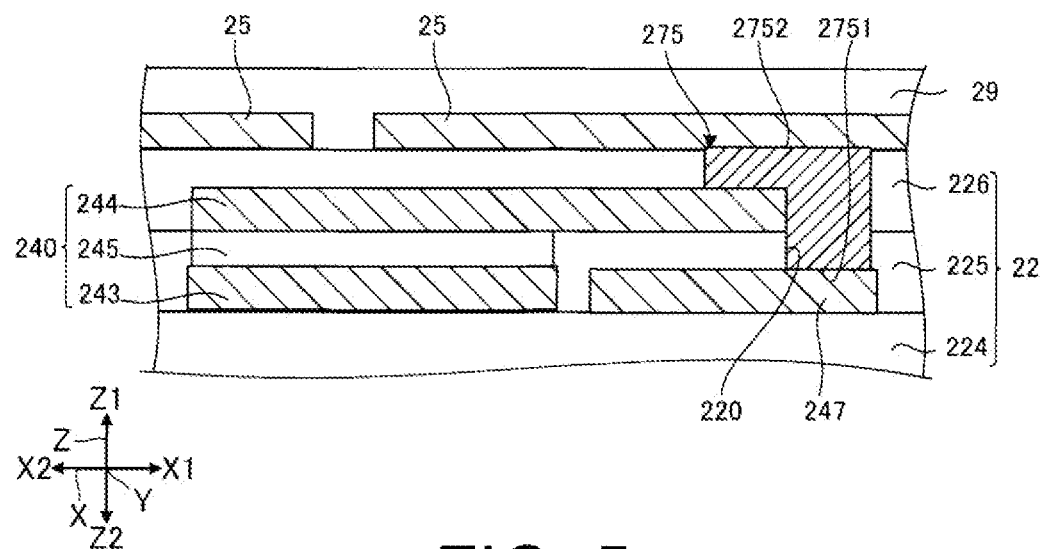
FIG. 5 is a cross-sectional view illustrating a portion of the element substrate illustrated in FIG. 4.

FIG. 5 is a cross-sectional view illustrating a portion of the element substrate 2 illustrated in FIG. 4. The electrode contact 275 illustrated in FIG. 5 is a columnar plug. The electrode contact 275 is disposed in a through hole 220 formed in the insulating layer 225 and the insulating layer 226.

The electrode contact 275 is directly coupled to the corresponding pixel electrode 25. The electrode contact 275 is directly coupled to the corresponding second relay electrode 247. The electrode contact 275 is directly coupled to the corresponding second capacitance electrode 244. Thus, the electrode contact 275 coupled to the pixel electrode 25 is coupled to the second capacitance electrode 244 and the second relay electrode 247. In other words, the electrode contact 275 is a penetration electrode in which a penetration electrode that couples the pixel electrode 25 and the second capacitance electrode 244, and a penetration electrode that couples the second capacitance electrode 244 and the second relay electrode 247 are integrally formed.

In this way, the single electrode contact 275 functions as both the coupling between the pixel electrode 25 and the second capacitance electrode 244 and the coupling between the second capacitance electrode 244 and the second relay electrode 247. Thus, the number of contacts can be reduced compared to a case where separate contacts are used for the coupling between the pixel electrode 25 and the second capacitance electrode 244 and the coupling between the second capacitance electrode 244 and the second relay electrode 247. Thus, the manufacturing process can be significantly simplified. Further, since the number of contacts can be reduced, restrictions on the layout of the contacts can be reduced. Thus, it is possible to downsize the electro-optical device 100 while suppressing a reduction in the opening ratio.

Further, as described above, the constant potential line 243, the second capacitance electrode 244, and the pixel electrode 25 are arranged in the Z1 direction in this order in a cross-sectional view. Further, the constant potential line 243 is positioned in the same layer as the second relay electrode 247. Thus, the second relay electrode 247 is positioned in the layer below the second capacitance electrode 244. Since the second relay electrode 247 and the second capacitance electrode 244 are positioned in different layers, an end surface 2751 of the electrode contact 275 in the Z2 direction includes a step. The end surface 2751 includes a portion that is in contact with the second capacitance electrode 244 and a portion that is in contact with the second relay electrode 247. Note that an end surface 2752 of the electrode contact 275 in the Z1 direction is in contact with the pixel electrode 25.

Further, in the embodiment, the constant potential line 243, the second capacitance electrode 244, and the pixel electrode 25 are arranged in this order in the vicinity of the liquid crystal layer 5, but the second capacitance electrode 244, the constant potential line 243, and the pixel electrode 25 may be arranged in this order in the vicinity of the liquid crystal layer 5. Note that there is a risk that the layout of the respective wiring may become complex and the shape of the electrode contact 275 may become complex. Thus, the second relay electrode 247, the second capacitance electrode 244, and the pixel electrode 25 are preferably coupled by the electrode contact 275 with the constant potential line 243, the second capacitance electrode 244, and the pixel electrode 25 being arranged so as to come closer to the liquid crystal layer 5 in this order.

Here, as illustrated in FIG. 4, the transistor 23 is disposed below the constant potential line 243. In the case of this arrangement, as described above, since the second relay electrode 247 positioned in the same layer as the constant potential line 243 is present, the electrode contact 275 can be formed more easily, compared to a case where the second relay electrode 247 is not present.

For example, if a portion of the electrode contact 275 is coupled to the first relay electrode 246 without the second relay electrode 247 being present, a portion of the electrode contact 275 needs to penetrate the insulating layers 224 to 226. Therefore, the length in the Z1 direction of the electrode contact 275 needs to be increased. Thus, in this case, the forming of the electrode contact 275 becomes difficult.

Note that in the embodiment, the second relay electrode 247 and the constant potential line 243 are present in the same layer, but the second relay electrode 247 and the constant potential line 243 need not necessarily be present in the same layer. Further, the second relay electrode 247 may be omitted. In this case, the first relay electrode 246 corresponds to a "drain electrode". However, when the second relay electrode 247 is omitted, the forming of the electrode contact 275 becomes difficult, as described above.

Further, the second relay electrode 247, the constant potential line 243, the second capacitance electrode 244, and the pixel electrode 25 are positioned above the scanning line 241 and the data line 242. Thus, in the embodiment, in a cross-sectional view, no other wiring is disposed between the second capacitance electrode 244 and the pixel electrode 25. Thus, compared to a case where other wiring is disposed between the second capacitance electrode 244 and the pixel electrode 2, the second capacitance electrode 244 and the pixel electrode 25 can be arranged closer to each other. As a result, the length of the electrode contact 275 in the Z1 direction can be shortened. Thus, the electrode contact 275 can be more easily formed.

Further, as described above, the electrode contact 275 is the columnar plug. Thus, an arrangement space can be reduced compared to a case where the electrode contact 275 is shaped along the inner wall surface of the through hole 220. Thus, the reduction in the opening ratio can be suppressed. Further, the occurrence of failures in the coupling between the pixel electrode 25 and the second capacitance electrode 244, and in the coupling between the second capacitance electrode 244 and the second capacitance electrode 244 can be suppressed.

Further, as described above, the material of the electrode contact 275 includes a metal such as tungsten, cobalt, copper, or the like, or a metal material such as a metal nitride, a metal silicide, or the like. In particular, the electrode contact 275 preferably includes tungsten. By including tungsten, it is possible to easily and reliably form the columnar electrode contact 275 that can sufficiently fill the through hole 220. Further, since tungsten has excellent heat resistance, deterioration of the electrode contact 275 due to heat treatment during manufacturing of the stack body 22 is suppressed.

Further, as a result of the electrode contact 275 including tungsten, it is possible to suppress electric corrosion occurring as a result of the electrode contact 275 coming into contact with the second relay electrode 247 or the second capacitance electrode 244. For example, if the electrode contact 275 is shaped along the inner wall surface of the through hole 220, the electrode contact 275 is formed of the same material as the material of the pixel electrode 25. In this case, the electrode contact 275 includes a transparent conductive material. When the electrode contact 275 includes the transparent conductive material, there is a risk of electric corrosion occurring as a result of the electrode contact 275 coming into contact with the second relay electrode 247 or the second capacitance electrode 244.

Note that the electrode contact 275 may be formed of a single material or may include a plurality of materials. For example, the electrode contact 275 may include a main body portion including tungsten and a barrier layer positioned between the main body portion and the inner wall surface of the through hole 220. The barrier layer includes a layer including at least one of titanium nitride (TiN), tantalum nitride (TaN), or tungsten nitride (WN). Further, the barrier layer may also include a plurality of layers.

Figure 6:
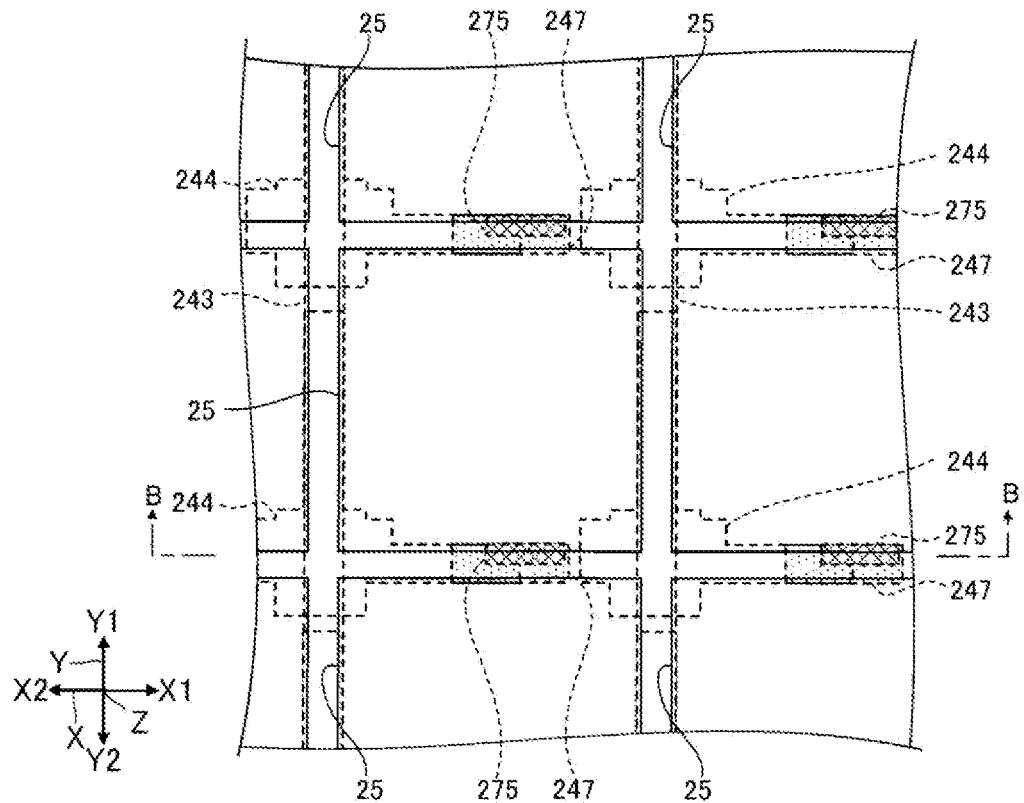
FIG. 6 is a plan view illustrating a portion of the element substrate illustrated in FIG. 4.

FIG. 6 is a plan view illustrating a portion of the element substrate 2 illustrated in FIG. 4. Note that in FIG. 6, the pixel electrode 25, the constant potential line 243, the second capacitance electrode 244, the second relay electrode 247, and the electrode contact 275 are illustrated. Further, for convenience, a dot pattern is applied to the second relay electrode 247, and shading is applied to the electrode contact 275. Further, FIG. 5 described above corresponds to a cross section taken along a line B-B illustrated in FIG. 6.

As illustrated in FIG. 6, in plan view, a portion of the pixel electrode 25 overlaps with a portion of the second relay electrode 247, a portion of the second capacitance electrode 244, and a portion of the electrode contact 275. Further, in plan view, the electrode contact 275 overlaps with a portion of the second relay electrode 247 and a portion of the second capacitance electrode 244.

The second relay electrode 247 and the second capacitance electrode 244 include portions that do not overlap with each other along the edge of the pixel electrode 25 in plan view. Further, the electrode contact 275 is disposed along the edge of the pixel electrode 25 in plan view. Thus, the electrode contact 275 that couples the pixel electrode 25, the second capacitance electrode 244, and the second relay electrode 247 can be formed while suppressing the reduction in the opening ratio.

In the embodiment, in plan view, the electrode contact 275 has a long shape along the X1 direction, which is an extending direction of the scanning line 241. The scanning line 241 extends in the X1 direction, as illustrated in FIG. 3. Further, in plan view, the second capacitance electrode 244 includes a portion that extends in the X1 direction from an intersection portion of the scanning line 241 and the data line 242. The second relay electrode 247 extends in the X1 direction in plan view. Then, in plan view, the second relay electrode 247 is disposed to be offset in the X1 direction with respect to the second capacitance electrode 244. Thus, by causing the electrode contact 275 to have the long shape along the X1 direction in plan view, the pixel electrode 25, the second relay electrode 247, and the second capacitance electrode 244 can be easily coupled by the electrode contact 275 without reducing the opening ratio.

Further, although not illustrated in detail, the capacitance element 240 has a shape in which the lengthwise direction thereof is the Y1 direction, in plan view. Then, the X1 direction that is the lengthwise direction of the electrode contact 275 in plan view intersects the Y1 direction that is the lengthwise direction of the capacitance element 240 in plan view. As a result, a reduction in the surface area of the capacitance element 240 due to the presence of the electrode contact 275 can be suppressed.

Note that, depending on the arrangement of the second relay electrode 247 and the second capacitance electrode 244, for example, an extending direction of the electrode contact 275 may be the Y1 direction in plan view. Further, the electrode contact 275 may be disposed in the intersection portion of the scanning line 241 and the data line 242 in plan view. In this case, the electrode contact 275 need not be formed in the shape along the edge of the pixel electrode 25 in plan view.

1Ad. Manufacturing Method of Electrode Contact 275

A manufacturing method of the electrode contact 275 and the wiring connected thereto will be described. Specifically, a manufacturing method of the capacitance element 240, the second relay electrode 247, and the electrode contact 275 will be described.

Figure 7:
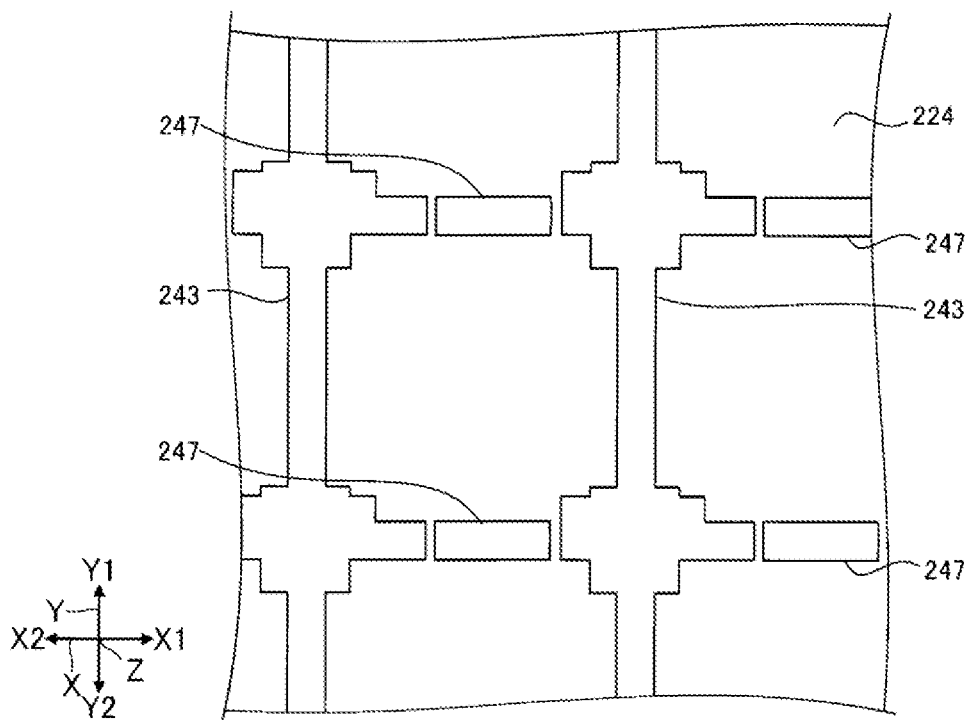
FIG. 7 is a plan view illustrating a capacitance line and a second relay electrode illustrated in FIG. 5.

FIG. 7 is a plan view illustrating the constant potential line 243 and the second relay electrode 247 illustrated in FIG. 5. As illustrated in FIG. 7, the constant potential line 243 and the second relay electrode 247 are formed on the insulating layer 224. The constant potential line 243 and the second relay electrode 247 are formed, for example, by forming a conductive film by physical vapor deposition (PVD) or the like, and then patterning the conductive film by etching. The constant potential line 243 extends in the Y1 direction in plan view. The second relay electrode 247 is disposed between two of the constant potential lines 243 in plan view. The second relay electrode 247 extends in the X1 direction in plan view.

Figure 8:
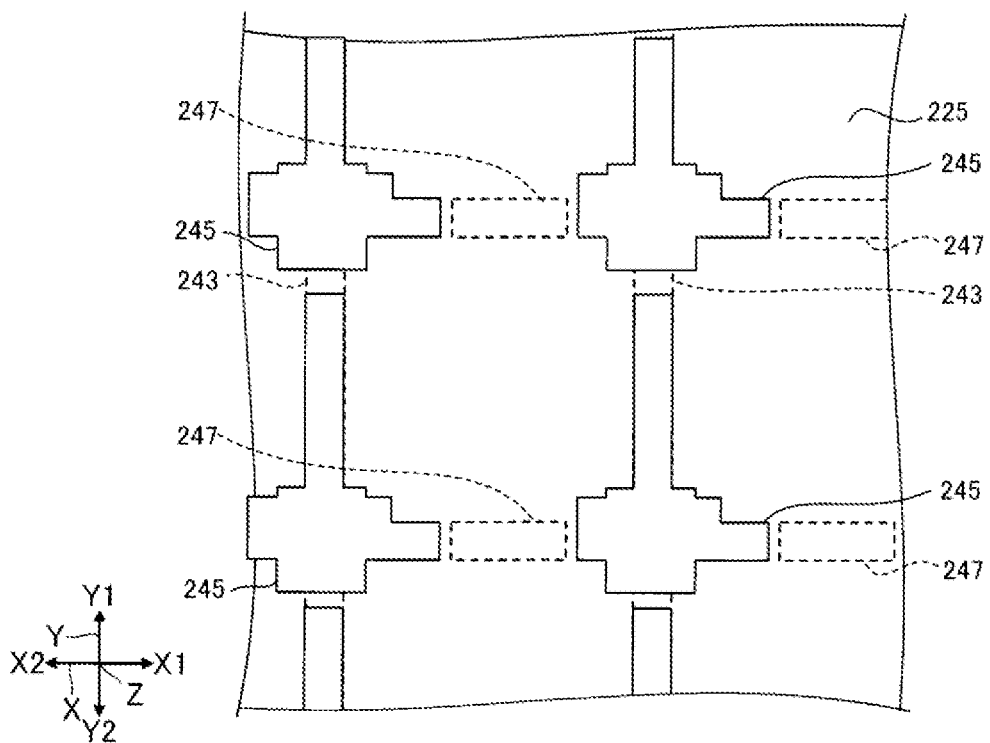
FIG. 8 is a plan view illustrating a dielectric layer illustrated in FIG. 5.

FIG. 8 is a plan view illustrating the dielectric layer 245 illustrated in FIG. 5. As illustrated in FIG. 8, the insulating layer 225 is formed on the constant potential line 243 and the second relay electrode 247. After that, a portion of the insulating layer 225 is removed by etching to form the dielectric layer 245 on the removed portion. The insulating layer 225 and the dielectric layer 245 are formed by thermal oxidation or CVD, for example.

Figure 9:
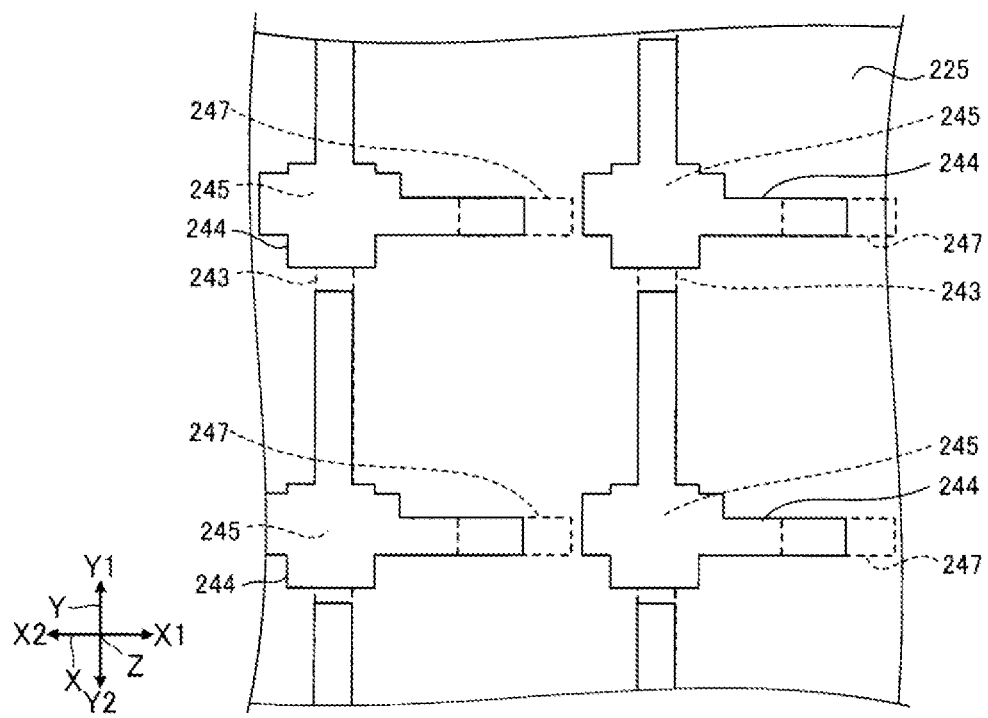
FIG. 9 is a plan view illustrating a second capacitance electrode illustrated in FIG. 5.

FIG. 9 is a plan view illustrating the second capacitance electrode 244 illustrated in FIG. 5. As illustrated in FIG. 9, the second capacitance electrode 244 is formed on the dielectric layer 245 so as to overlap the dielectric layer 245 in plan view. The second capacitance electrode 244 is formed, for example, by forming a conductive film using PVD or the like, and then patterning the conductive film by etching. Although not illustrated in detail, the second capacitance electrode 244 is positioned at the intersection portion of the scanning line 241 and the data line 242 in plan view. The second capacitance electrode 244 includes, in plan view, a portion extending in the X1 direction from the intersection portion and a portion extending in the Y1 direction from the intersection portion. Further, the second capacitance electrode 244 overlaps a portion of the second relay electrode 247 in plan view.

Figure 10:
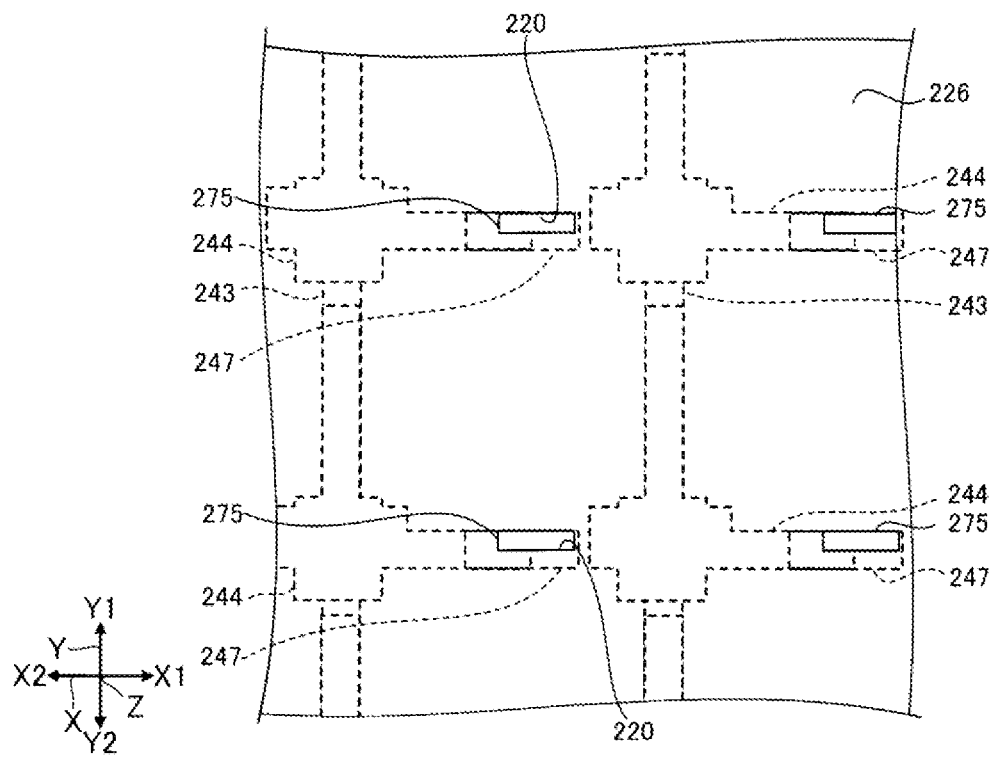
FIG. 10 is a plan view illustrating an electrode contact illustrated in FIG. 5.

FIG. 10 is a plan view illustrating the electrode contact 275 illustrated in FIG. 5. As illustrated in FIG. 10, after the insulating layer 226 is formed on the second capacitance electrode 244, the electrode contact 275 is formed on the insulating layer 226. The insulating layer 226 is formed by thermal oxidation or CVD, for example. Further, after forming the insulating layer 226, the through hole 220 is formed in the insulating layer 226. Then, the electrode contact 275 is formed to fill the through hole 220. The electrode contact 275 is formed, for example, by a sputtering method or CVD. In this way, the second capacitance electrode 244 and the second relay electrode 247 are electrically coupled via the electrode contact 275.

Further, although not illustrated, the pixel electrode 25 is formed after the electrode contact 275 is formed. In this way, the pixel electrode 25, the second capacitance electrode 244, and the second relay electrode 247 are coupled via the electrode contact 275.

According to the method described above, only the one contact is required for the coupling between the pixel electrode 25 and the second capacitance electrode 244 and the coupling between the second capacitance electrode 244 and the second relay electrode 247. In other words, by forming the electrode contact 275, the coupling between the pixel electrode 25 and the second capacitance electrode 244 and the coupling between the pixel electrode 25 and the second relay electrode 247 are possible. Thus, it is not necessary to form a plurality of contacts, and further, it is not necessary to form a plurality of through holes. Thus, the number of steps for manufacturing the element substrate 2 can be significantly reduced.

1B. Second Embodiment

A second embodiment will be described. Note that in each of examples below, elements having the same functions as those of the first embodiment will be assigned the same reference signs as those used in the description of the first embodiment, and a detailed description thereof will be omitted as appropriate.

Figure 11:
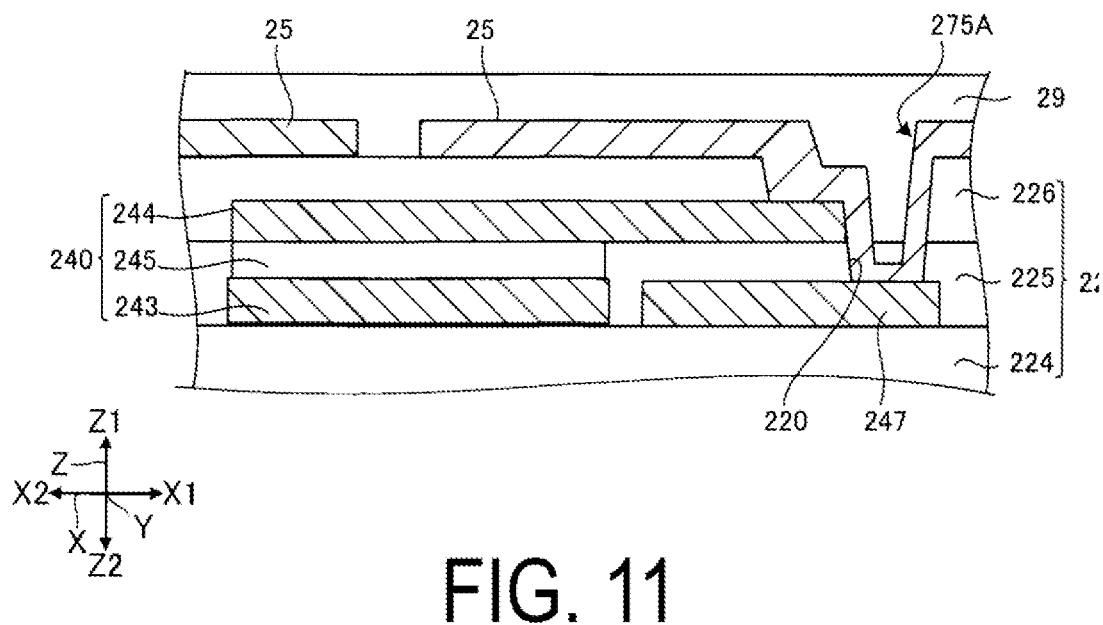
FIG. 11 is a cross-sectional view illustrating an electrode contact according to a second embodiment.

FIG. 11 is a cross-sectional view illustrating an electrode contact 275A of the second embodiment. The electrode contact 275A of this embodiment differs from the electrode contact 275 of the first embodiment in that the electrode contact 275A is formed integrally with the pixel electrode 25. In the following description, for the electrode contact 275A, points differing from the electrode contact 275 of the first embodiment will be described, and a description of the same points will be omitted.

As illustrated in FIG. 11, the electrode contact 275A has a shape along the inner wall surface of the through hole 220.

The electrode contact 275A includes a transparent conductive material such as ITO, IZO, FTO, or the like. The electrode contact 275A and the pixel electrode 25 include the same material. Since the electrode contact 275A and the pixel electrode 25 include the same material, they can be formed integrally, and thus the manufacture of the electrode contact 275A is easy.

Further, the pixel electrode 25 and the electrode contact 275A may have a multilayer structure. For example, the pixel electrode 25 and the electrode contact 275A include a main layer including a transparent conductive material, and a barrier layer disposed between the main layer and the insulating layer 226. The barrier layer includes a layer including at least one of titanium nitride (TiN), tantalum nitride (TaN), or tungsten nitride (WN). Note that the barrier layer may also include a plurality of layers. By including the barrier layer, it is possible to suppress electric corrosion occurring as a result of the main layer including the transparent conductive material coming into contact with the second relay electrode 247 or the second capacitance electrode 244. In particular, when the second relay electrode 247 or the second capacitance electrode 244 includes aluminum, it is effective for the electrode contact 275A to include the barrier layer.

2. Modified Examples

Each of the embodiments exemplified above can be variously modified. Specific modified modes that can be applied to each of the embodiments described above will be exemplified below. Two or more of the modes freely selected from the following exemplifications can be appropriately used in combination as long as mutual contradiction does not arise.

In each of the embodiments described above, the transistor 23 is the TFT, but the transistor 23 may be a metal-oxide-semiconductor field-effect transistor (MOSFET).

In each of the embodiments described above, the active matrix type electro-optical device 100 is exemplified, but the electro-optical device 100 is not limited thereto, and the driving method of the electro-optical device 100 may be a passive matrix method or the like, for example.

The driving method of the "electro-optical device" is not limited to a vertical electric field system, and may be a transverse electric field system. In the first embodiment, the pixel electrode 25 is provided on the element substrate 2, and the common electrode 33 is provided on the counter substrate 3. However, an electrode for applying an electric field to the liquid crystal layer 5 may be provided on only one of the element substrate 2 or the counter substrate 3. Note that examples of the transverse electric field system include an in plane switching (IPS) mode. Further, examples of the vertical electric field system include a twisted nematic (TN) mode, vertical alignment (VA), a PVA mode, and an optically compensated bend (OCB) mode.

3. Electronic Apparatus

The electro-optical device 100 can be used in various electronic apparatuses.

Figure 12:
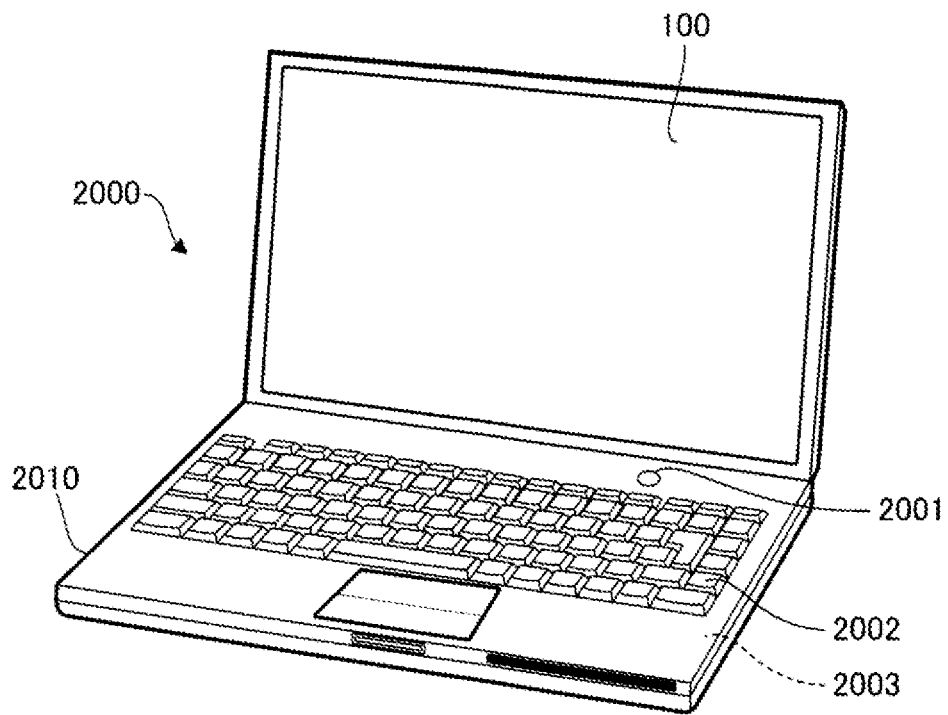
FIG. 12 is a perspective view illustrating a personal computer as an example of an electronic apparatus.

FIG. 12 is a perspective view illustrating a personal computer 2000 as an example of an electronic apparatus. The personal computer 2000 includes the electro-optical device 100 that displays various types of image, a main body unit 2010 in which a power source switch 2001 and a keyboard 2002 are installed, and a control unit 2003. The control unit 2003 includes a processor and a memory, for example, to control the operations of the electro-optical device 100.

Figure 13:
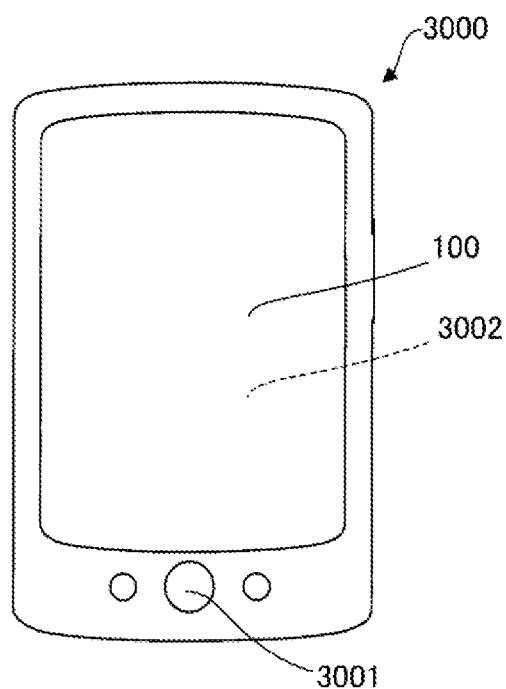
FIG. 13 is a front view illustrating a smart phone as an example of the electronic apparatus.

FIG. 13 is a plan view illustrating a smart phone 3000 as an example of the electronic apparatus. The smartphone 3000 includes an operating button 3001, the electro-optical device 100 that displays various types of image, and a control unit 3002. Screen content displayed on the electro-optical device 100 is changed in accordance with the operation of the operation button 3001. The control unit 3002 includes a processor and a memory, for example, to control the operations of the electro-optical device 100.

Figure 14:
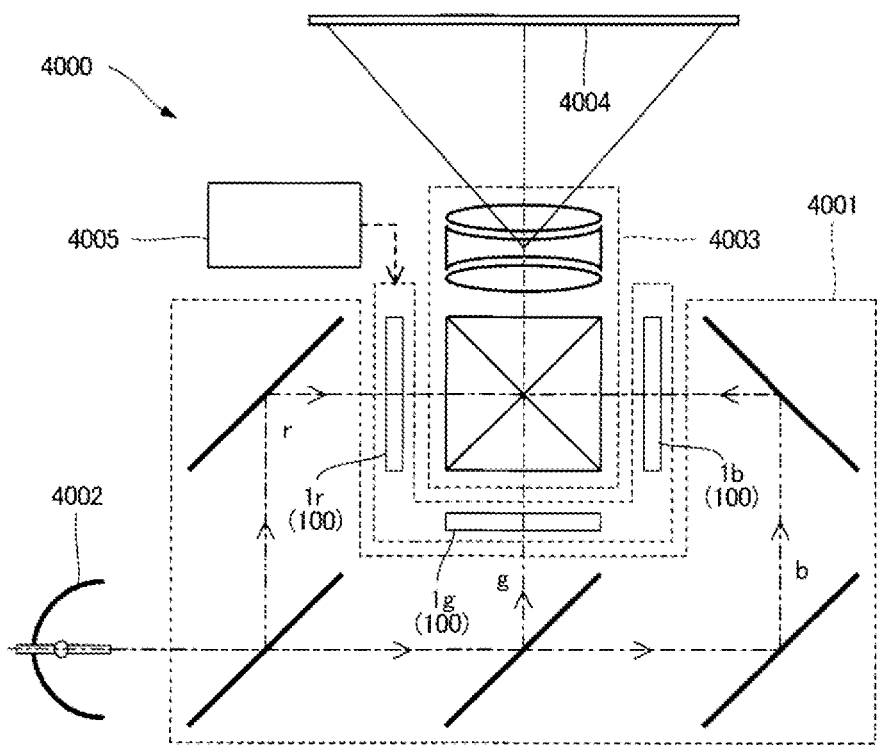
FIG. 14 is a schematic diagram illustrating a projector as an example of the electronic apparatus

FIG. 14 is a schematic diagram illustrating a configuration of a projector as an example of the electronic apparatus. A projection-type display device 4000 is a three-plate type projector, for example. An electro-optical device 1r is the electro-optical device 100 corresponding to a red display color, an electro-optical device 1g is the electro-optical device 100 corresponding to a green display color, and an electro-optical device 1b is the electro-optical device 100 corresponding to a blue display color. Specifically, the projection-type display device 4000 includes the three electro-optical devices 1r, 1g, and 1b that respectively correspond to the display colors of red, green, and blue. A control unit 4005 includes a processor and a memory, for example, to control the operations of the electro-optical device 100.

An illumination optical system 4001 supplies a red component r of light emitted from an illumination device 4002 as a light source to the electro-optical device 1r, a green component g of the light to the electro-optical device 1g, and a blue component b of the light to the electro-optical device 1b. Each of the electro-optical devices 1r, 1g, and 1b functions as an optical modulator, such as a light valve, that modulates respective rays of the monochromatic light supplied from the illumination optical system 4001, in accordance with display images. A projection optical system 4003 synthesizes the rays of the light emitted from each of the electro-optical devices 1r, 1g, and 1b to project the synthesized light onto a projection surface 4004.

The electronic apparatuses described above include the above-described electro-optical device 100 and the control units 2003, 3002, or 4005. By providing the electro-optical device 100 offering excellent productivity and a compact size, it is possible to downsize the personal computer 2000, the smartphone 3000, or the projection-type display apparatus 4000.

Note that the electronic apparatuses to which the electro-optical device according to the present disclosure is applied are not limited to those exemplified above, and include personal digital assistants (PDAs), a digital steel camera, a television, a video camera, a car navigation device, an in-vehicle display device (instrument panel), an electronic organizer, electronic paper, an electronic calculator, a word processor, a workstation, a video telephone, a point of sale (POS) terminal, and the like. Furthermore, other electronic apparatuses to which the present disclosure is applied include a printer, a scanner, a copier, a video player, a device provided with a touch panel, or the like.

The present disclosure is described above based on the preferred embodiments, but the present disclosure is not limited to the embodiments described above. Further, the configuration of each component of the present disclosure may be replaced with any configuration that exerts the equivalent functions of the above-described embodiments, and to which any configuration may be added.

Further, in the above description, the liquid crystal device is described as an example of the electro-optical device according to the present disclosure, but the electro-optical device according to the present disclosure is not limited thereto. For example, the electro-optical device according to the present disclosure can also be applied to an image sensor or the like. Further, for example, the present disclosure can also be applied to a display panel that uses a light-emitting element such as organic electroluminescence (EL), inorganic EL, and light-emitting polymers, in a similar manner to the embodiments described above. Further, the present disclosure can also be applied to an electrophoretic display panel that uses, as an electro-optical material, micro capsules each including colored liquid and white particles dispersed in a liquid, in a similar manner to the embodiments described above.

What is claimed is:

1. An electro-optical device comprising:
a pixel electrode;
a transistor including a semiconductor layer including a drain region and a gate electrode;
a scanning line electrically coupled to the gate electrode;
a capacitance element including a first capacitance electrode and a second capacitance electrode;
an electrode contact electrically coupled to the pixel electrode; and
a drain relay electrode electrically coupled to the drain region, wherein
the electrode contact is electrically coupled to the second capacitance electrode and the drain relay electrode,
the electrode contact is in direct contact with the pixel electrode, the second capacitance electrode and the drain relay electrode,
the second capacitance electrode includes an extending portion that extends along an extending direction of the scanning line in plan view,
the drain relay electrode has a long shape along the extending direction of the scanning line in plan view,
the electrode contact has a long shape along the extending direction of the scanning line in plan view, and the second capacitance electrode, the drain relay electrode and the electrode contact overlap the scanning line in plan view.

2. The electro-optical device according to claim 1, wherein
the electrode contact is disposed along an edge of the pixel electrode when viewed in a thickness direction of the pixel electrode.

3. The electro-optical device according to claim 1, wherein
the first capacitance electrode, the second capacitance electrode, and the pixel electrode are disposed in this order in the vicinity of the electro-optical layer.

4. The electro-optical device according to claim 1, wherein
the first capacitance electrode and the drain relay electrode are positioned at the same layer.

5. The electro-optical device according to claim 1, wherein
the electrode contact includes a material identical to a material of the pixel electrode.

6. The electro-optical device according to claim 1, wherein
the electrode contact includes tungsten.

7. The electro-optical device according to claim 1, wherein
the electrode contact is a columnar plug.

8. An electronic apparatus comprising:
the electro-optical device according to claim 1; and
a control unit configured to control operation of the electro-optical device.

* * * * *